United States Patent
Veschl (10) Patent No.: US 7,212,827 B1
(45) Date of Patent: May 1, 2007

(54) INTELLIGENT REMINDERS FOR WIRELESS PDA DEVICES

(75) Inventor: John P. Veschl, Fogelsville, PA (US)

(73) Assignee: Agere Systems Inc., Allentown, PA (US)

( * ) Notice: Subject to any disclaimer, the term of this patent is extended or adjusted under 35 U.S.C. 154(b) by 532 days.

(21) Appl. No.: 09/708,411

(22) Filed: Nov. 9, 2000

(51) Int. Cl.
*H04Q 7/20* (2006.01)

(52) U.S. Cl. .......... 455/456.1; 455/41.1; 455/41.2; 455/456.6; 455/456.3; 455/404.2; 455/556.2

(58) Field of Classification Search .......... 455/567, 455/41.1, 41.2, 41.3, 456.1, 456.6, 456.3, 455/444, 436, 440, 414.1, 404.2, 556.1, 556.2, 455/557

See application file for complete search history.

(56) References Cited

U.S. PATENT DOCUMENTS

| | | | | |
|---|---|---|---|---|
| 5,128,981 A | * | 7/1992 | Tsukamoto et al. | 455/450 |
| 6,020,810 A | * | 2/2000 | Har-Even | 340/328 |
| 6,265,974 B1 | * | 7/2001 | D'Angelo et al. | 340/568.1 |
| 6,396,399 B1 | * | 5/2002 | Dunlap | 340/540 |
| 6,462,660 B1 | * | 10/2002 | Cannon et al. | 340/572.1 |
| 6,539,232 B2 | * | 3/2003 | Hendrey et al. | 455/456.1 |
| 6,542,748 B2 | * | 4/2003 | Hendrey et al. | 455/456.1 |
| 6,542,749 B2 | * | 4/2003 | Tanaka et al. | 455/456.1 |
| 6,594,354 B1 | * | 7/2003 | Kelly | 379/201.1 |
| 6,614,350 B1 | * | 9/2003 | Lunsford et al. | 340/572.1 |
| 6,622,018 B1 | * | 9/2003 | Erekson | 455/420 |
| 6,650,894 B1 | * | 11/2003 | Berstis et al. | 455/420 |

FOREIGN PATENT DOCUMENTS

DE 4418234 A1 * 5/1994
WO WO 9933199 * 7/1999

OTHER PUBLICATIONS

U.S. Appl. No. 60/214,197, filed Jun. 26, 2000, Koopman et al.*
U.S. Appl. No. 60/210,682, filed Jun. 10, 2000, Hendrey et al.*
U.S. Appl. No. 60/216,721, filed Jul. 7, 2000, Hendrey et al.*
U.S. Appl. No. 60/210,691, filed Jun. 10, 2000, Hendrey et al.*

* cited by examiner

*Primary Examiner*—Matthew Anderson
*Assistant Examiner*—Sujatha Sharma (57) ABSTRACT

A wireless PDA device with proximity detection includes a trigger for implementing a reminder alert to a user of a wireless PDA device based on the proximity of another wireless PDA device. The proximity detection may be accomplished by actual knowledge of proximity (e.g., using appropriate GPS detection and reporting to a centralized location), or more preferably inferred using the short range capability of wireless networks such as a piconet network by comparing the members of a current piconet network (presumed to be within the range of the relevant wireless PDA device). In a disclosed embodiment, an intelligent reminder table is implemented for use by an appropriate reminder application running on a wireless PDA device. The reminder table includes a proximity alert election on an entry-by-entry basis, and automatic reminder canceling based on proximity detection of another wireless PDA device relevant to the reminder. Example proximity alerts include reminding the user to wish a person happy birthday the next time they see them (i.e., the next time that the other person is proximate to the relevant PDA user). The intelligent reminder table also provides for the automatic cancellation of a reminder when the reminder relates to a meeting with the other PDA user detected as being proximate to the relevant PDA user within a given time frame of a reminder date/time.

23 Claims, 4 Drawing Sheets

PROXIMITY REMINDER TABLE

| | 312 | 314 | 315 | 316 | 317 | 318 | 319 |
|---|---|---|---|---|---|---|---|
| | DATE | TIME | PDA IDENTITIES | PROXIMITY ALERT DETECTION | AUTO CANCEL | MESSAGE | AUTO REMINDER |
| 302 → | NOV. 1, 2001 | 7:00 AM | JOHN DOE | Y | N | MEETING RE: BUDGET | Y |
| | | | MARY BUCK | | | | Y |
| 304 → | — | — | TOM DUCK | Y | N | GIVE COPY OF PROPOSAL TO TOM | Y |
| 306 → | NOV. 7, 2001 | — | MARY BUCK | Y | N | WISH MARY HAPPY BIRTHDAY | Y |
| 308 → | — | — | JOHN DOE | Y | Y | CONGRATULATE TEAM | Y |
| | | | MARY BUCK | Y | Y | | Y |
| | | | TOM DUCK | Y | Y | | Y |
| | ⋮ | ⋮ | ⋮ | ⋮ | ⋮ | ⋮ | ⋮ |

FIG. 4

INTELLIGENT REMINDERS FOR WIRELESS PDA DEVICES

BACKGROUND OF THE INVENTION

1. Field of the Invention

The present invention relates to personal digital assistants (PDAs). More particularly, it relates to intelligent automation of a reminder and/or calendar system for a wireless PDA device.

2. Background of Related Art

Personal digital assistants (PDAs) and other hand-held portable computing devices are very popular consumer devices, particularly among the business sector. A PDA is a small, hand-held computer used to write notes, record names, addresses and phone numbers, to develop an appointment calendar, to read and write E-mail, and otherwise keep your life in order. PDA functionality is also incorporated into other electronic devices, e.g., cellular telephones.

Currently, PDA devices provide conventional reminder and calendar systems. These reminder systems allow a user to insert 'entries' into the PDA device asking for a reminder at a particular date and/or time. Alternatively, application programs such as Schedule Plus™ commercially available from Microsoft™ allow management of calendar functions on a personal computer (PC), and synchronization of the PC information with calendar information maintained on the PDA device.

To-do type reminders require frequent observation of the PDA device, and often a reminder involving another person the next time you see that person is seen too late, or after that person was seen. Moreover, reminders to attend a scheduled meeting are often provided even after a PDA user enters the meeting. If an audible alert is provided, the reminder can be disruptive to a meeting which starts earlier than scheduled. Moreover, cancellation of the reminder must be performed even after the meeting has occurred. This leads to excessive PDA operation, redundant reminders or reminders for events which have already taken place, and even to disruptions in meetings due to the PDA reminder alert itself.

There is a need for an intelligent and automatic reminder system for a PDA type device which reduces PDA operation time, reduces reminder redundancies, which eliminates reminders for events which have already taken place, and generally improves the accuracy of PDA reminders.

SUMMARY OF THE INVENTION

In accordance with the principles of the present invention, a wireless PDA device comprises a PDA device, and a wireless front end in communication with the PDA device. A reminder application runs on the PDA device, and a proximity detector is in communication with the reminder application. A reminder in the reminder application is triggered by a detected proximity to another wireless PDA device relevant to the reminder.

A method of providing a reminder alert from a first wireless PDA device in accordance with another aspect of the present invention comprises detecting a proximity between the first PDA device and a second wireless PDA device. A reminder alert is provided based on the detected proximity between the first wireless PDA device and the second wireless PDA device.

A method of providing a proximity alert to a first user of a first PDA device in accordance with yet another aspect of the present invention comprises creating a reminder relevant to a second user of a second PDA device. A proximity of the second PDA device to the first PDA device is detected. A reminder alert from the first PDA device is provided based on a detected proximity of the second PDA device to the first PDA device.

BRIEF DESCRIPTION OF THE DRAWINGS

Features and advantages of the present invention will become apparent to those skilled in the art from the following description with reference to the drawings, in which.

DETAILED DESCRIPTION OF ILLUSTRATIVE EMBODIMENTS

The present invention provides a wireless PDA capable of triggering reminder events (e.g., alert, automatic cancellation, etc.) based on a detected proximity to one or more other wireless PDAs relevant to the reminder. In the preferred embodiment, the wireless PDA with proximity remind capabilities infers proximity to one or more other relevant wireless PDAs by utilizing a wireless local network established between the wireless personal digital assistant (PDA) type devices to intelligently act on reminder, to-do-list, or calendar entries in a user's PDA device.

The present invention adds proximity detection of relevant other PDA users as a trigger for implementing a reminder alert to a user of a wireless PDA device. The proximity detection may be accomplished by actual knowledge of proximity, e.g., using appropriate GPS detection in each PDA device and a threshold distance between GPS locations. However, more preferably, proximity to another wireless PDA is inferred using the short range capability of wireless networks such as a piconet network by comparing the members of a current piconet network (presumed to be within the range of the relevant wireless PDA device).

The present invention utilizes a short range wireless network, e.g., a network utilizing the cordless telephone interface standards such as the 900 MHz band in the United States, but most particularly a piconet network such as a BLUETOOTH™ conforming piconet, to augment an otherwise conventional PDA type device with the ability to automatically, indiscreetly, efficiently and cost effectively implement and/or dispose of reminder entries in a calendar or reminder type application in the PDA type device.

Figure 1:
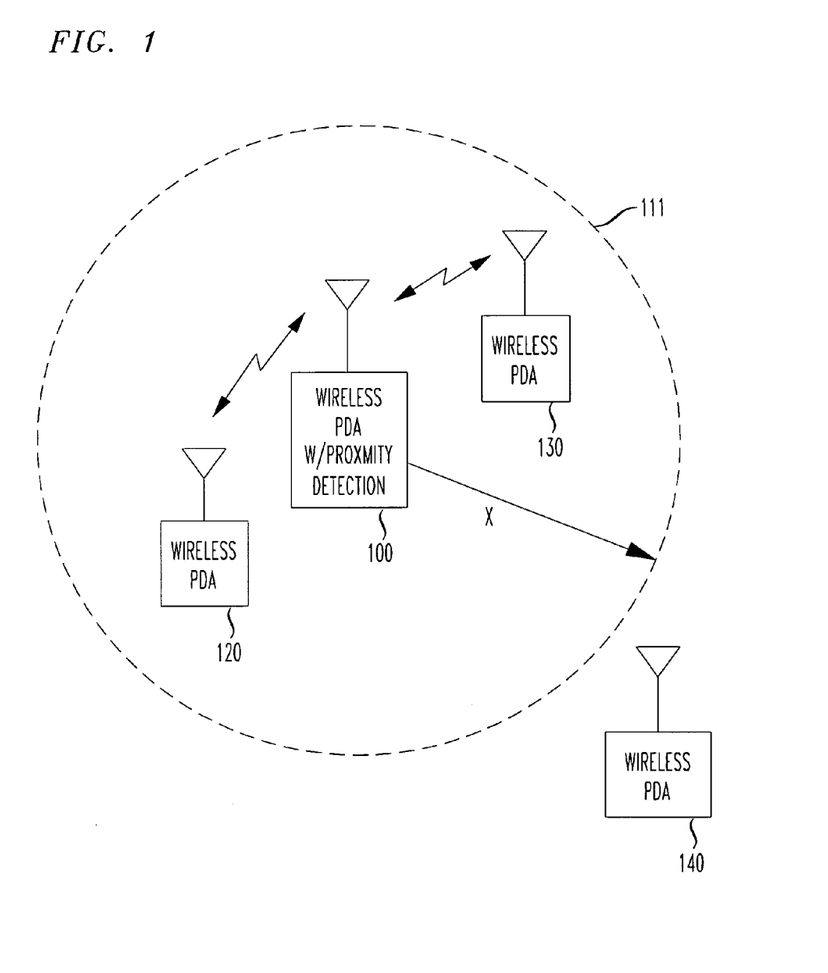
FIG. 1 shows a relevant wireless PDA device with proximity detection, within range of two other wireless PDA devices, and out-of-range of another wireless PDA device, in accordance with the principles of the present invention.

FIG. 1 shows a relevant wireless PDA device with proximity detection 100, within range of two other wireless PDA devices 120, 130 and out-of-range of another wireless PDA device 140, in accordance with the principles of the present invention.

In particular, as shown in FIG. 1, the wireless PDA with proximity detection 100 as well as the other wireless PDA devices 120, 130 within range of the wireless PDA with proximity detection 100 each establish a presence on a wireless piconet network. This allows each of the wireless PDA devices 100, 120, 130 to be added as a member of the piconet network, and allows each of the wireless PDA devices 100, 120, 130 to exchange electronic information with any device on the piconet network.

The establishment of the piconet connection and exchange of electronic information may take place at any time after the wireless PDA devices 100, 120, 130 come within range of one another, or within range of another wireless PDA device that is in turn within range of the access piconet device. Thus, while the piconet network is depicted as having a circular range 111 in FIG. 1, it is actually a shape including a range from each of the wireless PDA devices 100, 120, 130.

The wireless PDA device 100 including proximity detection as shown in the example of FIG. 1 is proximate to two other wireless PDA devices 120, 130, and not proximate (i.e., too far away) from another wireless PDA device 140. As a result of the inferred proximity between the user's wireless PDA with proximity detection 100 and the two other wireless PDA devices within a short range x of the wireless PDA with proximity detection 100, reminders relevant to the proximate wireless PDA devices 120, 130 will be triggered in an appropriate reminder or calendar application program running in the wireless PDA with proximity detection 100, in accordance with the principles of the present invention.

A plurality of piconet networks may be interconnected through a scatternet connection, in accordance with BLUETOOTH™ protocols. Thus, a master of a piconet network has the capability to know whether or not other members of the piconet networks are either in the immediate piconet network, or accessing the immediate piconet network via a scatternet connection. This type information may be translated into proximity information, and provide for adaptive changes to reminder entries in a calendar system.

For instance, a scatternet connection of another wireless PDA device might be presumed to indicate that the other wireless PDA user is somewhere within an office building, and a reminder might be generated based on the presence of the other wireless PDA user upon their entrance to the office building. Similarly, presence on the immediate piconet network not via the scatternet connection may be used to indicate a proximate location of the other wireless PDA device.

Furthermore, information regarding the type of network connection (e.g., immediate piconet or via a scatternet connection) may be used to change the type of reminder alert, e.g., from audible if the other wireless PDA device is merely in the office building as presumed from a presence via a scatternet connection, to a vibration reminder if the other wireless PDA device has a presence on the piconet network.

A transition of another wireless PDA device from a scatternet connection to a direct connection to the immediate piconet network, or a transition from a direct connection to the immediate piconet network to a scatternet connection may also trigger a change in a reminder entry. For instance, a transition from a piconet network connection to a scatternet connection may trigger a reminder such as "Catch John Doe before he leaves".

Figure 2:
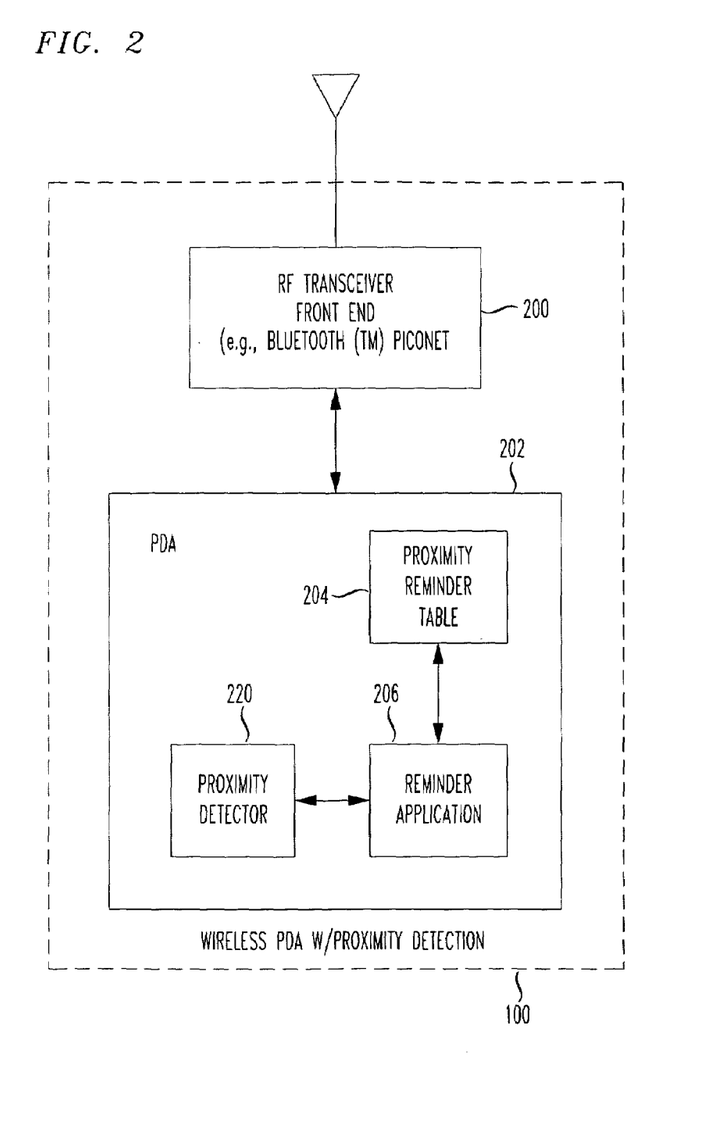
FIG. 2 shows a block diagram of an exemplary wireless PDA with proximity detection, in accordance with the principles of the present invention.

FIG. 2 shows a block diagram of an exemplary wireless PDA with proximity detection 100, in accordance with the principles of the present invention.

In particular, as shown in FIG. 2, the wireless PDA with proximity detection 100 includes a PDA 202, and a suitable short range wireless RF transceiver front end 200. In the preferred embodiment, the RF transceiver front end 200 is a piconet front end, e.g., conforming to a BLUETOOTH™ standard.

The disclosed RF transceiver front end 200 is wireless, and is preferably very short range radio frequency (RF). The shorter the range of the wireless network, the closer is the inferred proximity detection by the wireless PDA with proximity detection 100.

The wireless frequency may be 2.4 GHz as per BLUETOOTH standards, and/or having a 20 to 100 foot range. The RF transmitter may operate in common frequencies which do not necessarily require a license from the regulating government authorities, e.g., the Federal Communications Commission (FCC) in the United States. Alternatively, the wireless communication can be accomplished with infrared (IR) transmitters and receivers, but this is less preferable because of the directional and visual problems often associated with IR systems. Moreover, other suitable wireless protocols and technologies may be implemented to accomplish the wireless link. For instance, BLUETOOTH network technology may be utilized to implement a wireless piconet network connection (including scatternet). The BLUETOOTH standard for wireless piconet networks is well known, and is available from many sources, e.g., from the web site www.bluetooth.com.

The PDA 202 includes a suitable reminder application program 206 which effectively forms a reminder or calendar system. The reminder application program 206 communicates with a proximity detector 220.

The proximity detector 220 maintains a list of other wireless PDA devices which are within a proximity of the wireless PDA with proximity detection 100. In the disclosed embodiment, this list is simply a list of the current members of a piconet network (e.g., a BLUETOOTH piconet network) including the wireless PDA with proximity detection 100.

Of course, other proximity detectors 220 are possible within the scope of the present invention. For instance, all wireless PDA devices may include global positioning satellite (GPS) systems which provide the capability to identify an exact physical location to other wireless PDA devices within a network.

In particular, proximity detection (i.e., presence in a piconet) may be based on successful access to a relevant piconet (i.e., being within range of the piconet RF signal from the wireless PDA with proximity detection 100). Alternatively, a global positioning system (GPS) or other locating device may be implemented in a wireless PDA 100, 120, 130 to provide absolute location information. Using a GPS, when the user of a wireless PDA 100, 120, 130 extends beyond a configurable threshold distance (e.g., 10 feet, 30 feet, 100 feet, etc.), the reminder or calendar system can operate as if the relevant PDA user's are not proximate.

Of course, historical information may be logged to provide 'hysteresis' to a user of a PDA skirting in and out of range of the piconet. The feasibility of implementing a GPS within a wireless PDA device 100, 120, 130 and utilizing the same to provide proximity information as between wireless PDA devices 100, 120, 130 in accordance with the principles of the present invention depends upon a balance of size, cost, and/or power consumption with the needs of a particular application.

In this embodiment, a relevant distance may be measured between the GPS readings of the user's wireless PDA with proximity detection 100 and other wireless PDA devices 120, 130 currently members of a relevant wireless network (e.g., piconet). This measured distance may be compared to a threshold configured by a manufacturer or set by a user of the wireless PDA with proximity detection 100 (e.g., 30 feet) to determine proximity of each of the other wireless PDA devices to the user's wireless PDA with proximity detection 100.

The reminder alerts from the wireless PDA with proximity detection 100 may take any of a multitude of formats, e.g., audio formats such as beep tone, or song, and/or physical formats such as vibration. Of course, the reminder may alternatively or additionally be displayed on an LCD display along with or instead of an audible and/or vibration alert.

While the disclosed embodiments relate to piconet networks, and particularly to BLUETOOTH piconet networks, the principles of the present invention relate to wireless networks other than just piconet networks. For instance, the established local RF network may utilize frequency modulation (FM) techniques.

In the example of a BLUETOOTH piconet, the current BLUETOOTH standards permit one (1) master and seven (7) slaves to be active in the piconet at any one time. In accordance with the principles of the present invention, after a wireless PDA 120, 130 enters the piconet wireless network as a slave and communicates with an appropriate master PDA device, that electronic wireless PDA device may then be placed into a 'park' mode. In this way, many more than seven (7) wireless PDA devices may be 'proximate' at any one time.

Figure 3:
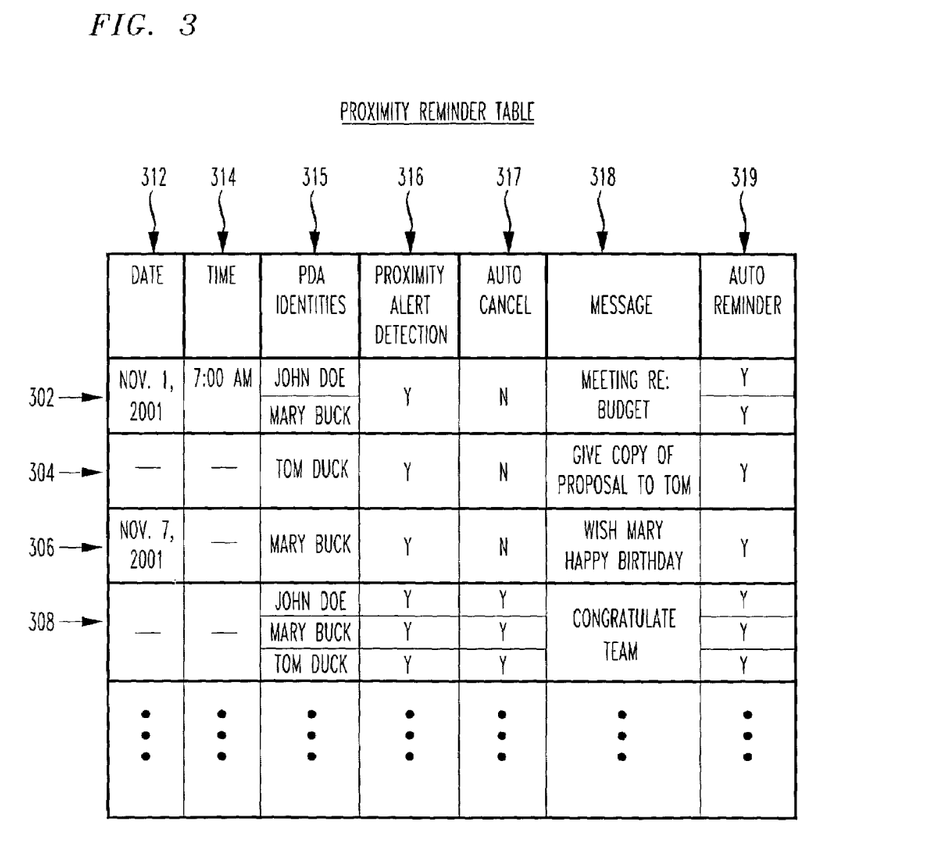
FIG. 3 shows an exemplary embodiment of a proximity autoremind table shown in FIG. 2.

FIG. 3 shows an exemplary embodiment of a proximity auto-reminder table 204 shown in FIG. 2. The table of FIG. 3 is intended for illustrative purposes showing but one example implementation of proximity reminding in accordance with the principles of the present invention. Of course, a multitude of other possible formats may be implemented to provide proximity reminding, in accordance with the principles of the present invention.

In particular, as shown in FIG. 3, the proximity auto-reminder table 204 includes a plurality of reminder entries 302–308. Each of the reminder entries 302–308 may include information relating to date 312, time 314, the identities of PDA's 315 relating to the reminder entry, whether or not proximity alert detection 316 is desired, whether or not autocancel 317 is desired, a text and/or graphics reminder message for display 318, and/or whether or not the reminder is to include an audible alert 319.

All entries 302–308 may be entered with appropriate prompting through an appropriate user interface (e.g., a graphical user interface) of an appropriate reminder or calendar application operating on the relevant wireless PDA device 100. Alternatively, any or all entries 302–308 may be entered and/or otherwise synchronized with entries maintained on a personal computer (PC) or other computing device running an appropriate calendar application (e.g., Schedule plus™).

With respect to the first exemplary reminder entry 302 in the proximity reminder table 204, a reminder has been established for the user to be at a "meeting regarding a budget" on Nov. 1, 2001, at 7:00 am. The reminder entry 302 includes an association with the users of other wireless PDA devices, in particular, John Doe and Mary Buck.

With respect to John Doe, proximity alert detection is to be enabled, thus enabling a determination at 7:00 am, on Nov. 1, 2001, whether or not John Doe is within proximity (i.e., within range) of the user. If so, the meeting is presumed to have already begun, and automatic cancellation of the reminder with respect to John Doe may occur (per the "Y" configuration of the auto-cancel parameter of the entry 302). If John Doe is not within a proximity of the user at the reminder time of 7:00 am on Nov. 1, 2001, then the reminder can be presented to the user graphically, and audibly if so configured in the autoremind parameter 319.

In this way, a meeting which has already begun between the user and John Doe need not be interrupted by an audible reminder. Moreover, excessive time need not be wasted by the user in eventually manually canceling the reminder either during or after the meeting takes place.

Proximity based monitoring may be the default mode of an entry in the proximity reminder table. Moreover, detected proximity may operate to change a parameter of an entry 302–308. For instance, a reminder type may be changed, e.g., from audible to vibration when a person is detected as being within range, e.g., present in the relevant piconet. Moreover, this reminder type may be changed back to its previous value upon detection that the relevant other wireless PDA device is no longer proximate.

To show the flexibility in the proximity reminder table, the entry 302 also includes Mary Buck as a participant in the budget meeting. However, the proximity alert detection parameter 316 is not activated with respect to Mary Buck. Thus, the reminder entry 302 will be provided to the user in an otherwise conventional fashion, without automatic cancellation or detection of the presence of Mary Buck within range of the wireless PDA user.

Entry 304 demonstrates the ability to provide a reminder based entirely on when the wireless PDA user becomes within range (i.e., proximate) to a person, e.g., Tom Duck.

In particular, as shown in entry 304, proximity alert detection 316 is enabled, but no date 312 or time 314 is configured. Thus, the reminder "Give Copy of Proposal To Tom" (with audible alert per parameter 319) will be provided when Tom Duck's wireless PDA is next detected within range of the wireless PDA user.

Entry 306 extends the advantages of the proximity reminder of entry 304 to provide a reminder the first time of a particular day (e.g., Nov. 7, 2001) that a person (i.e., Mary Buck) comes within range of the wireless PDA user. Thus, on Nov. 7, 2001, as soon as Mary Buck's wireless PDA is detected within range, an audible reminder for "Wish Mary Happy Birthday" will be provided to the wireless PDA user.

Entry 308 shows yet another example proximity reminder, wherein a reminder "Congratulate Team" is provided, with audible alert, the next time the wireless PDA user becomes proximate to each of John Doe, Mary Buck, and Tom Duck. Thus, three separate proximate reminders may be provided each based on proximity to particular wireless PDA users, and each from a singular reminder entry.

Figure 4:
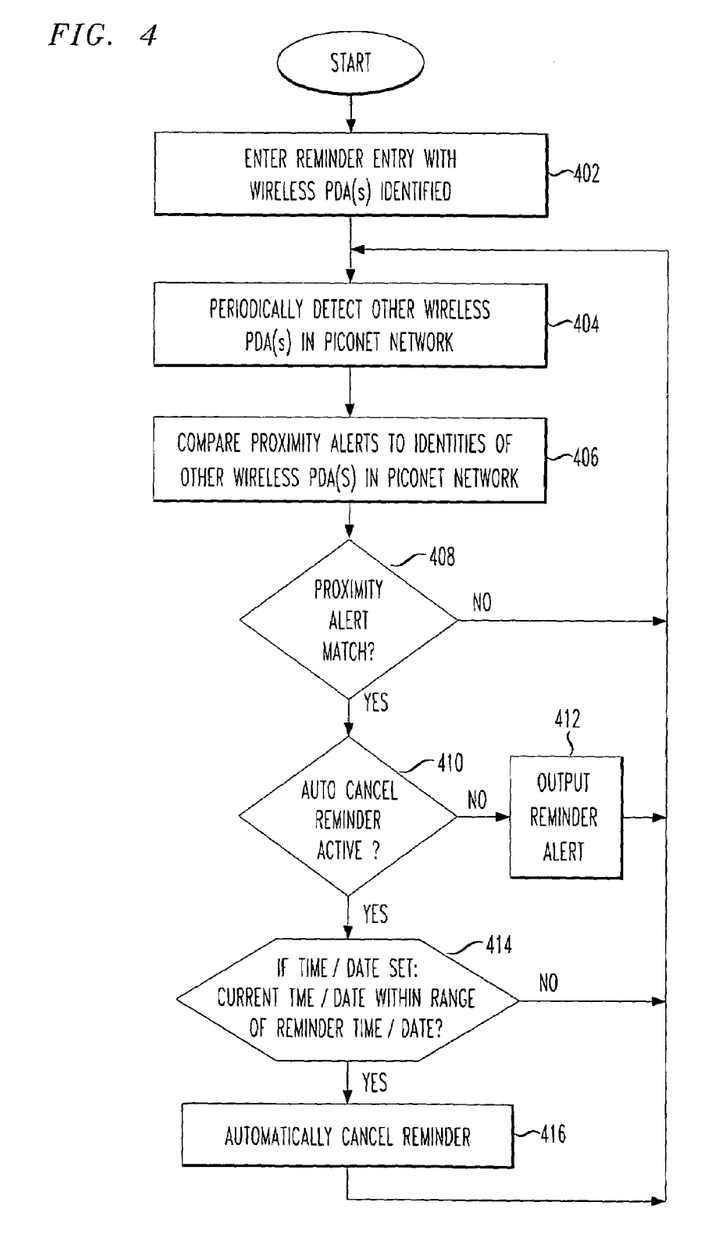
FIG. 4 shows an exemplary process of automatically and intelligently providing reminders from a wireless PDA device based on an inferred proximity to another wireless PDA device relevant to the reminder, in accordance with the principles of the present invention.

FIG. 4 shows an exemplary process of automatically and intelligently providing reminders from a wireless PDA device based on an inferred proximity to another wireless PDA device relevant to the reminder, in accordance with the principles of the present invention.

In particular, as shown in step 402 of FIG. 4, a proximity reminder entry is entered into the proximity reminder table 204, including the identities (e.g., PIN numbers, network identities, name, etc.) of at least one other wireless PDA.

In step 404, a proximity detector 220 periodically checks to see what other wireless PDA devices are within the proximity (e.g., within range) of the user.

In step 406, each of the pending entries 302–308 are checked against the identities of those other wireless PDA devices detected as being proximate, e.g., having a presence on the piconet network (e.g., BLUETOOTH piconet network) on which the relevant user's wireless PDA device has a presence.

In step 408, matches of PDA devices to the entered PDA identities 315 are determined. If no match is found between all pending reminders 302–308 and any proximate PDA device, then the periodic detection of proximate PDA users repeats.

In step 410, the setting of the automatic cancellation of reminders is determined. If set, the reminder alert is automatically output, as shown in step 412.

In step 414, if the time 312 and/or date 314 parameters are set, then a determination is made as to whether or not the current time/date is within range of the reminder time/date parameters 312, 314.

If so, then the reminder entry is automatically cancelled as shown in step 416, and the process returns to step 404.

While the invention has been described with reference to the exemplary preferred embodiments thereof, those skilled in the art will be able to make various modifications to the described embodiments of the invention without departing from the true spirit and scope of the invention.

What is claimed is:

1. A wireless PDA device, comprising:
   a PDA device;
   a wireless front end in communication with said PDA device;
   a reminder application to run on said PDA device; and
   a proximity detector substantially within said wireless PDA device in communication with said reminder application to detect a proximity of said wireless PDA to another wireless PDA;
   wherein a reminder in said reminder application is automatically transferred to said another wireless PDA device when a detected proximity to said another wireless PDA device is less than about a pre-established threshold.

2. The wireless PDA device according to claim 1, wherein:
   said wireless front end is a piconet front end.

3. The wireless PDA device according to claim 2, wherein:
   said piconet front end is a BLUETOOTH front end.

4. The wireless PDA device according to claim 1, further comprising:
   a proximity reminder table, in communication with said reminder application, to associate other wireless PDA devices with specific reminder tasks.

5. The wireless PDA device according to claim 4, wherein said proximity reminder table comprises:
   an entry associating a particular wireless PDA device with a desire to output an alert when said wireless PDA device becomes proximate to said particular wireless PDA device.

6. The wireless PDA device according to claim 5, wherein said proximity reminder table further comprises:
   an option to automatically cancel said output of said alert when said particular PDA device is proximate to said wireless PDA device.

7. The wireless PDA device according to claim 6, wherein said proximity reminder table further comprises:
   a date/time for said reminder alert;
   wherein said option to automatically cancel said output allows cancellation of said alert only within a range of time of said date/time for said reminder alert.

8. A method of providing a reminder alert from a first wireless PDA device, comprising:
   detecting a proximity between said first PDA device and a second wireless PDA device with said first PDA device; and
   automatically transferring a reminder alert when said detected proximity between said first wireless PDA device and said second wireless PDA device is less than about a pre-established threshold.

9. The method of providing a reminder alert from a first wireless PDA device according to claim 8, wherein:
   said proximity is inferred by a presence of said second wireless PDA device on a local network including said first wireless PDA device.

10. The method of providing a reminder alert from a first wireless PDA device according to claim 9, wherein:
    said local network is a piconet network.

11. The method of providing a reminder alert from a first wireless PDA device according to claim 10, wherein:
    said piconet network conforms to a BLUETOOTH standard.

12. A method of providing a proximity alert to a first user of a first PDA device, comprising:
    creating a reminder relevant to a second user of a second PDA device;
    detecting a proximity of said second PDA device to said first PDA device with said first PDA device; and
    automatically transferring a reminder alert from said first PDA device when a detected proximity of said second PDA device to said first PDA device is less than about a pre-established threshold.

13. The method of providing a proximity alert to a first user of a first PDA device according to claim 12, wherein:
    said reminder alert is an audible alert.

14. The method of providing a proximity alert to a first user of a first PDA device according to claim 12, wherein said detecting proximity comprises:
    determining a presence of said second PDA device in a local wireless network including a presence of said first PDA device.

15. The method of providing a proximity alert to a first user of a first PDA device according to claim 12, wherein said detecting proximity comprises:
    measuring a first set of location coordinates of said first PDA device;
    measuring a second set of location coordinates of said second PDA device;
    determining a distance between said first set of location coordinates and said second set of location coordinates; and
    comparing said determined distance to a threshold proximity distance.

16. Apparatus for providing a reminder alert from a first wireless PDA device, comprising:
    means for detecting a proximity between said first PDA device and a second wireless PDA device with said first PDA device; and
    means for automatically transferring a reminder alert when said detected proximity between said first wireless PDA device and said second wireless PDA device is less than about a pre-established threshold.

17. The apparatus for providing a reminder alert from a first wireless PDA device according to claim 16, wherein:
    said means for detecting said proximity infers said proximity by a presence of said second wireless PDA device on a local network including said first wireless PDA device.

18. The apparatus for providing a reminder alert from a first wireless PDA device according to claim 17, wherein: said local network is a piconet network.

19. The apparatus for providing a reminder alert from a first wireless PDA device according to claim 16, wherein: said piconet network conforms to a BLUETOOTH standard.

20. Apparatus for providing a proximity alert to a first user of a first PDA device, comprising:
   means for creating a reminder relevant to a second user of a second PDA device;
   means for detecting a proximity of said second PDA device to said first PDA device with said first PDA device; and
   means for automatically transferring a reminder alert from said first PDA device when a detected proximity of said second PDA device to said first PDA device is less than about a pre-established threshold.

21. The apparatus for providing a proximity alert to a first user of a first PDA device according to claim 20, wherein: said means for providing said reminder alert provides an audible alert.

22. The apparatus for providing a proximity alert to a first user of a first PDA device according to claim 20, wherein said detecting proximity comprises:
   means for determining a presence of said second PDA device in a local wireless network including a presence of said first PDA device.

23. The apparatus for providing a proximity alert to a first user of a first PDA device according to claim 20, wherein said detecting proximity comprises:
   means for measuring a first set of location coordinates of said first PDA device;
   means for measuring a second set of location coordinates of said second PDA device;
   means for determining a distance between said first set of location coordinates and said second set of location coordinates; and
   means for comparing said determined distance to a threshold proximity distance.

* * * * *

UNITED STATES PATENT AND TRADEMARK OFFICE
CERTIFICATE OF CORRECTION

PATENT NO. : 7,212,827 B1 Page 1 of 1
APPLICATION NO. : 09/708411
DATED : May 1, 2007
INVENTOR(S) : Veschi It is certified that error appears in the above-identified patent and that said Letters Patent is hereby corrected as shown below:

On the title page items (12) and (75) should be corrected to read:

(12) United States Patent
 Veschi (75) Inventor: John P. Veschi, Fogelsville, PA Signed and Sealed this Nineteenth Day of June, 2007

JON W. DUDAS
*Director of the United States Patent and Trademark Office*